US011638072B2

United States Patent
Suzuki et al.

(10) Patent No.: US 11,638,072 B2
(45) Date of Patent: Apr. 25, 2023

(54) IMAGE DETECTION DEVICE, PULSED ILLUMINATION DEVICE, AND PULSED ILLUMINATION METHOD

(71) Applicant: MITUTOYO CORPORATION, Kanagawa (JP)

(72) Inventors: Raiitsu Suzuki, Kanagawa (JP); Yuki Kurahashi, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 285 days.

(21) Appl. No.: 17/012,291

(22) Filed: Sep. 4, 2020

(65) Prior Publication Data

US 2021/0075951 A1 Mar. 11, 2021

(30) Foreign Application Priority Data

Sep. 10, 2019 (JP) .............................. JP2019-164435

(51) Int. Cl.
 *H04N 23/74* (2023.01)
 *H04N 23/56* (2023.01)

(52) U.S. Cl.
 CPC .............. *H04N 23/74* (2023.01); *H04N 23/56* (2023.01)

(58) Field of Classification Search
 CPC .......................... H04N 5/2256; H04N 5/2354
 See application file for complete search history.

(56) References Cited

U.S. PATENT DOCUMENTS

| 2006/0133061 A1* | 6/2006 | Maeda | H04N 5/2354 362/6 |
| 2015/0054979 A1* | 2/2015 | Ou | G02B 27/58 348/222.1 |

FOREIGN PATENT DOCUMENTS

| JP | H04-161916 A | 6/1992 |
| JP | 2002-311496 A | 10/2002 |
| JP | 2008-032645 A | 2/2008 |
| JP | 2015-127769 A | 7/2015 |
| JP | 2015-191000 A | 11/2015 |
| JP | 2017-223651 A | 12/2017 |
| JP | 2018-189702 | 11/2018 |

OTHER PUBLICATIONS

Office Action issued in Corresponding JP Patent Application No. 2019-164435, dated Mar. 14, 2023, along with an English translation thereof.

* cited by examiner

*Primary Examiner* — Nicholas G Giles
(74) *Attorney, Agent, or Firm* — Greenblum & Bernstein, P.L.C.

(57) ABSTRACT

An image detection device includes: a liquid resonant lens system whose focal point is cyclically changed; an image detector configured to detect an image of an object through the lens system; a pulsed illuminator configured to provide pulsed illumination to the object in synchronization with the focal point; and an illumination controller configured to control the pulsed illuminator, in which the pulsed illuminator includes a main illumination section and a supplementary illumination section, and the illumination controller is configured to provide pulsed illumination to the object with the main illumination section and supplement illuminance on the object with the supplementary illumination section when the illuminance on the object by the main illumination section is equal to or less than a predetermined threshold.

5 Claims, 7 Drawing Sheets

IMAGE DETECTION DEVICE, PULSED ILLUMINATION DEVICE, AND PULSED ILLUMINATION METHOD

The entire disclosure of Japanese Patent Application No. 2019-164435 filed Sep. 10, 2019 is expressly incorporated by reference herein.

TECHNICAL FIELD

The present invention relates to an image detection device, a pulsed illumination device, and a pulsed illumination method.

BACKGROUND ART

A variable focal length lens in a form of a liquid resonant lens system has been developed. An image detection device in which this lens system is combined with a pulsed illumination device has been developed to detect an image in focus at a desired position of a target (Patent Literature 1: JP2018-189702 A).

The liquid resonant lens system generates a standing wave in an internal liquid by a cyclic drive signal to cyclically change a focal point of a lens.

The image detection device is configured to apply a pulsed illumination in synchronization with a predetermined phase angle of the drive signal for driving the lens system, thereby detecting an image on a to-be-imaged surface that coincides with a focal point corresponding to the predetermined phase angle. The image detection device can detect a multi-focus image of the target by setting a plurality of phase angles in synchronization with the pulsed illumination in one cycle.

The image detection device described above needs to adjust a light volume of the pulsed illumination depending on a surface condition appearing on a to-be-imaged surface of the target.

For instance, when the target is an IC chip, the IC chip has a less reflective surface such as a black resin package surface and a highly reflective surface such as a metallic pin for wiring. For this reason, a typical illumination with a constant light volume causes a problem that a clear image cannot be obtained on the less reflective surface and overexposure occurs on the highly reflective surfaces.

Accordingly, when the focal point changes, it is required to increase or decrease the light volume of the pulsed illumination depending on a condition of the to-be-imaged surface that coincides with the focal point. Particularly, for detection of a multi-focus image, it is required to increase or decrease the light volume of the pulsed illumination at a plurality of focal points.

However, since the focal point is changing at a high speed in the liquid resonant lens system, an interval of the pulsed illumination requires to be as short as microseconds and a pulse width has to be as narrow as several tens nanoseconds in order to take an image of the to-be-imaged surface at a predetermined focal point through the pulsed illumination. The pulsed illumination under such conditions results in a small duty ratio of the pulsed illumination duration and an insufficient light volume for illumination.

Further, since an electrical circuit capable of synchronizing a high-speed and short-duration pulsed illumination is difficult to provide, the light volume cannot be increased by increasing the number of an emitting device. Thus, it has been desired to provide an image detection device using a high-speed variable focal length lens such as a liquid resonant lens system by overcoming the problem of insufficient light volume of the pulsed illumination of the image detection device.

SUMMARY OF THE INVENTION

An object of the invention is to provide an image detection device, a pulsed illumination device, and a pulsed illumination method that are capable of obtaining a sufficient light volume while detecting an image with a liquid resonant lens system.

According to an aspect of the invention, an image detection device includes: a liquid resonant lens system whose focal point is cyclically changeable; an image detector configured to detect an image of an object through the lens system; a pulsed illuminator configured to provide pulsed illumination to the object in synchronization with the focal point; and an illumination controller configured to control the pulsed illuminator, in which the pulsed illuminator includes a main illumination section and a supplementary illumination section, and the illumination controller is configured to provide pulsed illumination to the object with the main illumination section, and to supplement illuminance on the object with the supplementary illumination section when the illuminance on the object by the main illumination section is equal to or less than a predetermined threshold.

In the above arrangement, the image detector detects an image of the object through the lens system whose focal point is being cyclically changed. During the detection, the illumination controller controls the pulsed illuminator to provide pulsed illumination to the object in synchronization with the focal point, whereby an image on a to-be-imaged surface at a desired focal point can be detected.

The pulsed illuminator provides pulsed illumination to the object with the main illumination section in a normal state, and supplements the illuminance on the object with the supplementary illumination section when the illuminance on the object by the main illumination section is equal to or less than the predetermined threshold. The pulsed illuminator is thus capable of performing pulsed illumination at a high speed while keeping a sufficient light volume of the pulsed illumination. Specifically, the pulsed illuminator, which includes the main illumination section for ensuring a change in the light volume and the high-speed operation required for the pulsed illumination and the supplementary illumination section for ensuring a large light volume, can, as a whole, achieve both the high-speed operation and the large light volume.

As described above, the image detection device with the above arrangement can ensure a sufficient light volume while detecting the image with the liquid resonant lens system.

In the image detection device with the above arrangement, the supplementary illumination section preferably provides continuous illumination.

In this arrangement, the supplementary illumination section does not require a timing control for pulsed illumination, which simplifies the control configuration. Even if the supplementary illumination section provides the continuous illumination, as long as the illuminance on the object by the supplementary illumination section is equal to or less than a predetermined value, an influence on the detection image can be avoided.

It should be noted that the supplementary illumination section may provide pulsed illumination. As long as a main timing of the pulsed illumination is ensured by the main illumination section, an accuracy of a timing of the pulsed illumination of the supplementary illumination section may be reduced, allowing for a simple control.

In the image detection device with the above arrangement, it is preferable that the main illumination section is an epi-illuminator and the supplementary illumination section is a ring illuminator.

In this arrangement, since the main illumination section is defined to be the epi-illuminator, the pulsed illumination is prioritized in the detection image, and an accuracy of the focal point can be improved by controlling the timing of the pulsed illumination. Moreover, the supplementary illumination section, which is in a form of the ring illuminator, can increase an entire illuminance on the object from the periphery thereof, so that the supplementary illumination section can supplement the illuminance on the measurement target without affecting the pulsed illumination of the main illumination section.

According to another aspect of the invention, a pulsed illumination device configured to provide pulsed illumination to an object when taking an image of the object with a liquid resonant lens system, includes: a pulsed illuminator configured to provide pulsed illumination to the object; and an illumination controller configured to control the pulsed illuminator, in which the pulsed illuminator includes a main illumination section and a supplementary illumination section, and the illumination controller is configured to supplement illuminance on the object with the supplementary illumination section when the illuminance on the object by the main illumination section is equal to or less than a predetermined threshold.

According to still another aspect of the invention, a pulsed light illumination method of providing pulsed illumination to an object when taking an image of the object with a liquid resonant lens system, includes: providing pulsed illumination to the object with a main illumination section in a normal state; and supplementing illuminance on the object with a supplementary illumination section when the illuminance on the object by the main illumination section is equal to or less than a predetermined threshold.

In this arrangement, a high-speed operation is achievable while keeping a sufficient light volume of the pulsed illumination. Specifically, a change in the light volume required for the pulsed illumination and the high-speed operation can be ensured with the main illumination section and a large light volume can be ensured with the supplementary illumination section. With this shared operation, both the high-speed operation and the large light volume are achievable as a whole.

As described above, the pulsed illumination device and the pulsed illumination method with the above arrangement can ensure a sufficient light volume for detecting the image with the liquid resonant lens system.

According to the above aspects of the invention, an image detection device, a pulsed illumination device, and a pulsed illumination method that are capable of obtaining a sufficient light volume while detecting an image with a liquid resonant lens system can be provided.

BRIEF DESCRIPTION OF DRAWING(S)

DESCRIPTION OF EMBODIMENT(S)

An exemplary embodiment of the invention will be described below with reference to the attached drawings.

Figure 1:
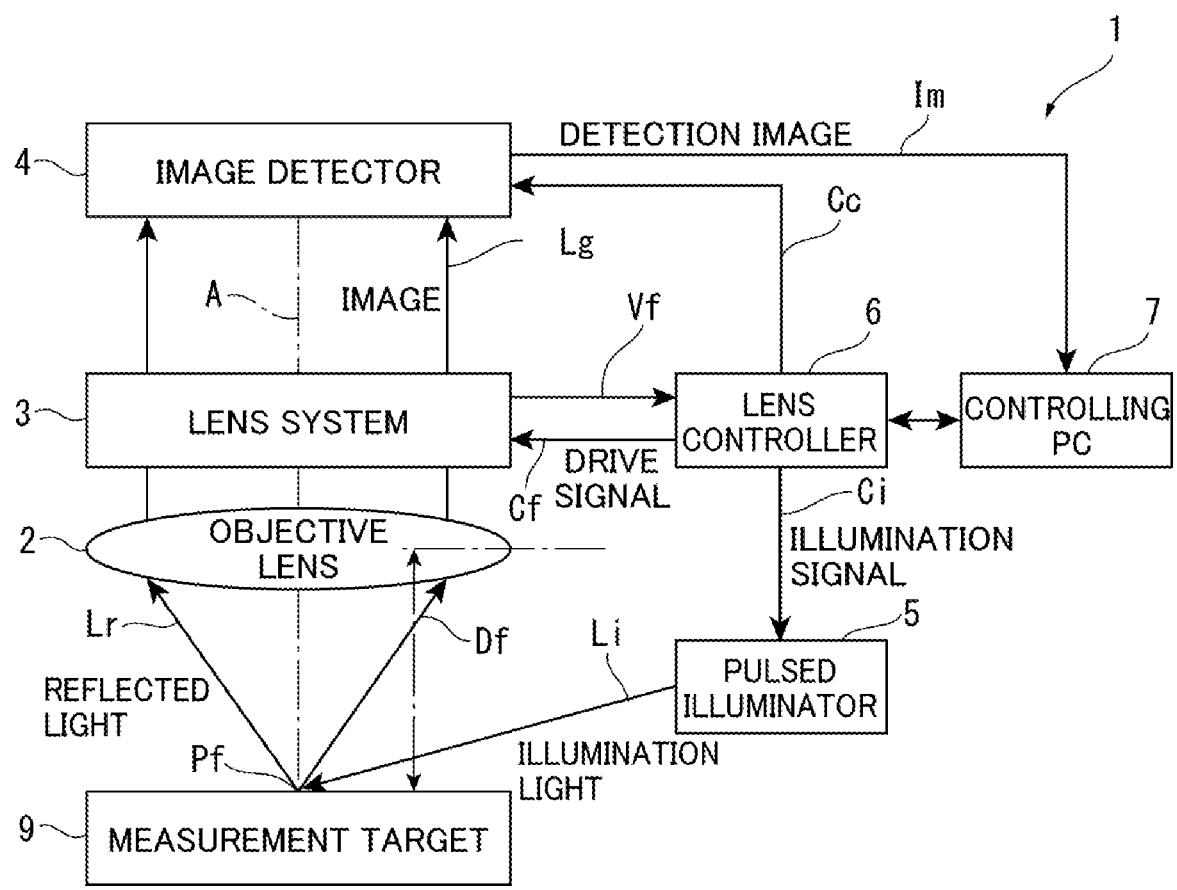
FIG. 1 is a block diagram showing an overall configuration according to an exemplary embodiment of the invention.

FIG. 1 shows an overall configuration of an image detection device 1 according to an exemplary embodiment of the invention.

The image detection device 1, which is configured to detect an image of a surface of a measurement target 9 placed in a to-be-imaged region at a focal length that is cyclically changed, includes an objective lens 2, a lens system 3 and an image detector 4 that are placed on the same optical axis A intersecting the surface.

Further, the image detection device 1 includes: a pulsed illuminator 5 configured to emit pulsed light on the surface of the measurement target 9; a lens controller 6 configured to control operations of the lens system 3 and the pulsed illuminator 5; and a controlling PC 7 configured to operate the lens controller 6.

An existing convex lens is used as the objective lens 2.

The lens system 3, which is a variable focal length lens of a liquid resonance type, is configured to change a refractive index in response to a drive signal Cf inputted from the lens controller 6. The drive signal Cf is a sinusoidal alternating-current (AC) signal of a frequency generating a standing wave in the lens system 3.

In the image detection device 1, a focal length Df to a focal point Pf can be changed as needed based on a focal length of the objective lens 2 by changing the refractive index of the lens system 3.

In the image detection device 1, the drive signal Cf is a sinusoidal AC signal, and the focal point Pf and the focal length Df are also cyclically and sinusoidally changeable.

In this configuration, when the image detection device 1 emits pulsed light on the measurement target 9 present at the focal point Pf at a desired point in an oscillation waveform of the focal point Pf and detects the image illuminated at that time, the image of the measurement target 9 at the focal point Pf can be obtained.

The image detector 4, which is exemplified by an existing CCD (Charge Coupled Device) image sensor or a camera of some other sorts, can output an incident image Lg to the controlling PC 7 as a detection image Im in a predetermined signal format.

The pulsed illuminator 5 in a form of a light emitting device such as LED (Light Emitting Diode) can emit pulsed light on the surface of the measurement target 9 by emitting an illumination light Li for a predetermined time when an illumination signal Ci is inputted from the lens controller 6.

In the image detection device 1, the drive of the lens system 3, the illumination of the pulsed illuminator 5 and the image detection of the image detector 4 are controlled in accordance with the drive signal Cf, the illumination signal Ci and an image detection signal Cc from the lens controller 6, respectively. The controlling PC 7 is connected to the lens controller 6 in order to operate settings and the like of the lens controller 6 for performing the above control.

Figure 2:
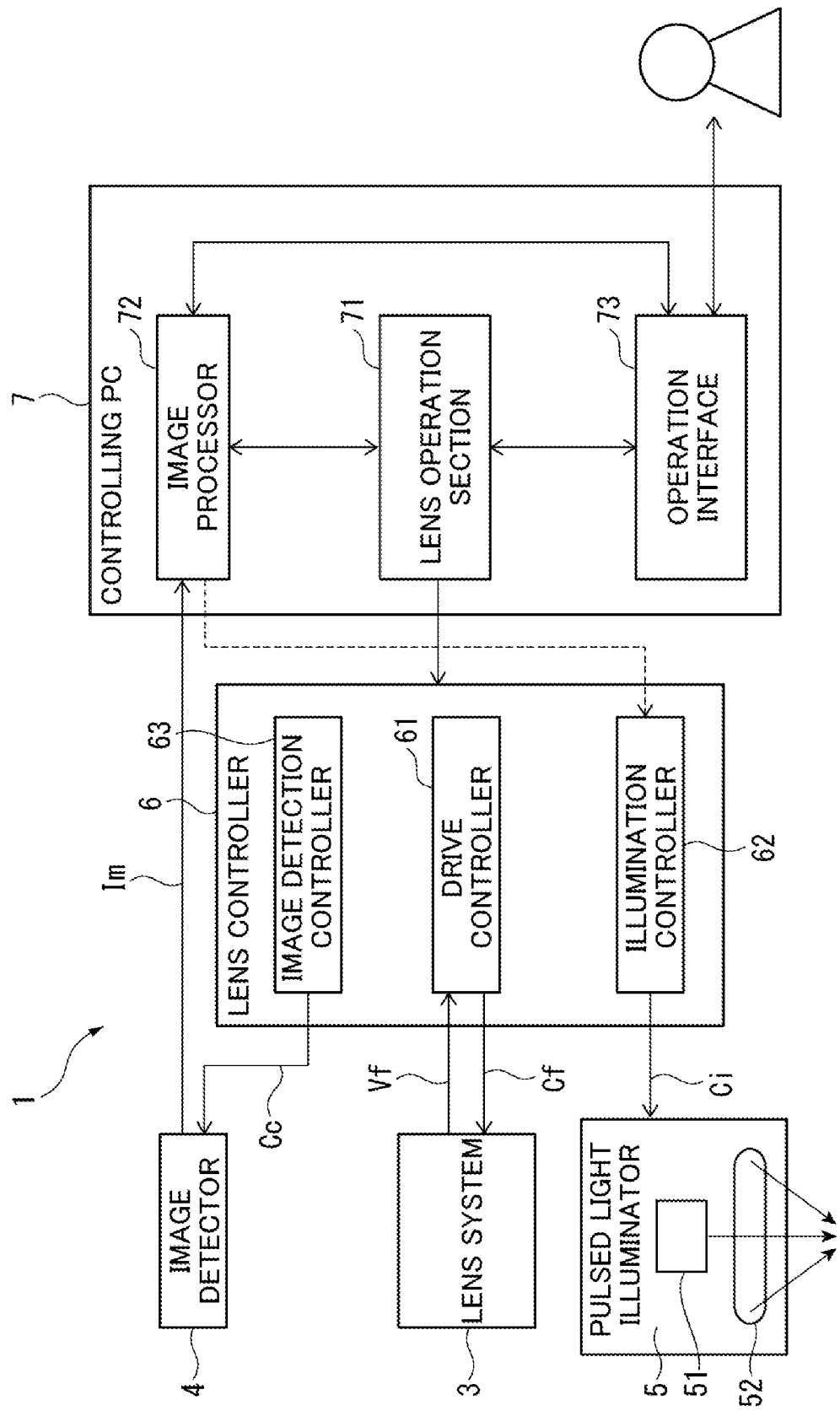
FIG. 2 is a block diagram showing a relevant part in the exemplary embodiment.

FIG. 2 shows the configuration of the lens controller 6 and the controlling PC 7 in the exemplary embodiment.

The lens controller 6, which is a dedicated unit in a form of a hardware for controlling operations of the lens system 3 and the pulsed illuminator 5, includes: a drive controller 61 configured to output the drive signal Cf to the lens system 3; an illumination controller 62 configured to output the illumination signal Ci to the pulsed illuminator 5; and an image detection controller 63 configured to output the image detection signal Cc to the image detector 4.

While outputting the drive signal Cf to the lens system 3, the drive controller 61 detects an oscillation state Vf of the lens system 3 based on an effective power or drive current applied to the lens system 3 when the lens system 3 oscillates in response to the drive signal Cf. By adjusting the frequency of the drive signal Cf with reference to the oscillation state Vf of the lens system 3, the lens system 3 can be locked at the current resonance frequency. The oscillation state Vf can be detected with an oscillation sensor provided in the lens system 3.

The illumination controller 62 outputs the illumination signal Ci to the pulsed illuminator 5 to make the pulsed illuminator 5 emit pulsed light on the measurement target 9 in the to-be-imaged region. An illumination timing of the illumination signal Ci is synchronized with the drive signal Cf and set at a predetermined phase angle relative to the focal point Pf.

The image detection controller 63 outputs an image detection signal Cc to the image detector 4 to control ON or OFF of the image detection. The detection image Im in one frame detected by the image detector 4 during a period from the image detection ON (i.e. the time when the image detection is switched on) to the image detection OFF (i.e. the time when the image detection is switched off) is transmitted to the controlling PC 7 to be processed.

In the exemplary embodiment, the output of the image detection signal Cc is continued for a predetermined period, during which the measurement target 9 is pulse-illuminated at a predetermined position (i.e. a phase angle in the cycle of change) of the focal point Pf for a plurality of timings, whereby images at the focal points Pf at the illumination timings are detected. The illumination signal Ci specifying the illumination timings is defined so that the light is emitted at a plurality of timings within a variable range of the focal point Pf, thereby allowing detection of a multi-focus image in which a plurality of images focused at the focal points Pf are superimposed.

The controlling PC 7 includes: a lens operation section 71 for operating various setting operations to the lens controller 6; an image processor 72 configured to import and process the detection image Im from the image detector 4; and an operation interface 73 for allowing a user's operation to the image detection device 1.

The controlling PC 7, which is a general-purpose personal computer, runs dedicated software to achieve the intended functions. Specifically, the function of the lens operation section 71 that controls the lens controller 6 is achieved by running the lens operation software. Moreover, the function of the image processor 72 that processes the detection image Im from the image detector 4 is achieved by running image processing software. The lens operation software and the image processing software can be operated by the user through the operation interface 73 using a display screen and an input device of the controlling PC 7.

In the exemplary embodiment, the pulsed illuminator 5 includes two kinds of light source devices: a main illumination section 51 using an LED epi-illuminator; and a supplementary illumination section 52 using an LED ring illuminator.

In the exemplary embodiment, at the pulsed illumination for the image detection as described above, the illumination controller 62, which is configured to control the main illumination section 51 to emit pulsed light on the measurement target 9 in a normal state, is configured to control the supplementary illumination section 52 to supplement the illuminance on the measurement target 9 when the illuminance on the measurement target 9 by the main illumination section 51 is equal to or less than a predetermined threshold.

As the illuminance on the measurement target 9 for judging the threshold, the illumination controller 62 uses illuminance in the detection image Im of the measurement target 9 obtained by the image processor 72 of the controlling PC 7. The predetermined threshold of the illuminance is defined to be illuminance enough for the image detector 4 to detect the detection image Im.

Figure 3:
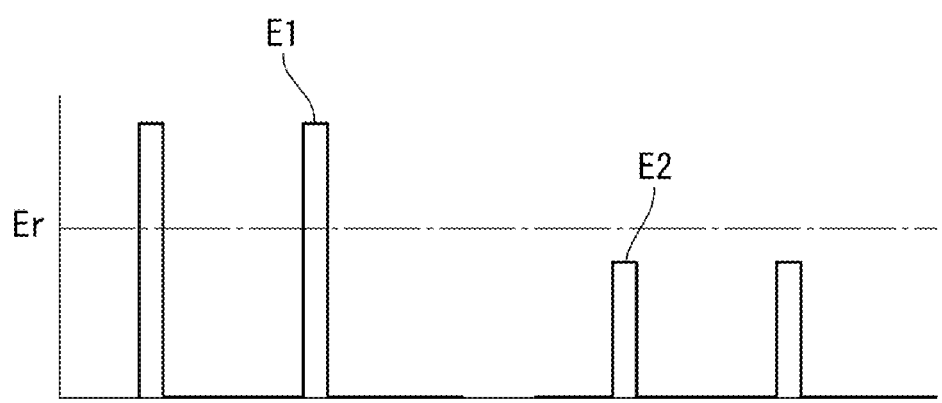
FIG. 3 is a graph showing illuminance by illumination only with a main illumination section in the exemplary embodiment.

As shown in FIG. 3, while the measurement target 9 is being applied with the pulsed illumination, illuminance E of the measurement target 9 is shown in a pulsed waveform corresponding to the pulsed waveform of the illumination light Li.

Providing that the measurement target 9 is applied with pulsed illumination only by the main illumination section 51, a sufficient illuminance E1 exceeding the illuminance threshold Er can be obtained, for instance, at a relatively large surface reflectance of the measurement target 9. On the other hand, for instance, at a relatively small surface reflectance of the measurement target 9, illuminance E2 does not reach the illuminance threshold Er only with the pulsed illumination of the main illumination section 51.

The illumination controller 62 of the exemplary embodiment supplements the illuminance with the supplementary illumination section 52 when the illuminance E2 of only the pulsed illumination by the main illumination section 51 does not reach the illuminance threshold Er.

Figure 4:
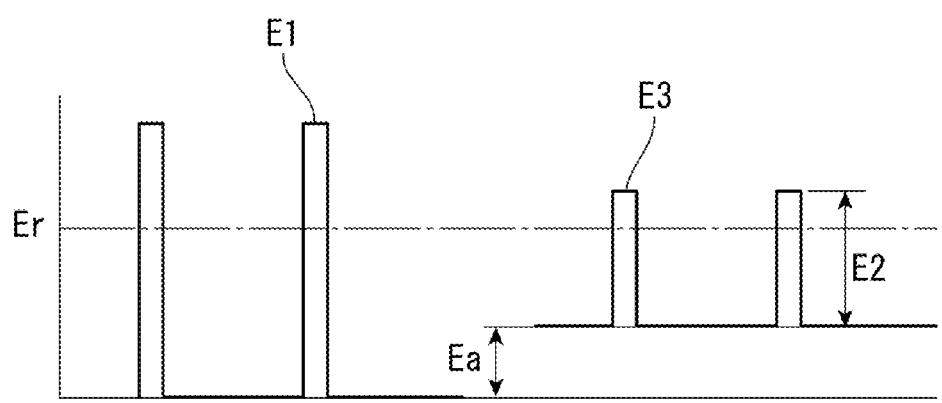
FIG. 4 is a graph showing illuminance by illumination only with a supplementary illumination section in the exemplary embodiment.

As shown in FIG. 4, even when the illuminance E2 of the measurement target 9 applied with the pulsed illumination of the main illumination section 51 is smaller than the illuminance threshold Er, illuminance E3 in total, which is added with the illuminance Ea by the supplementary illumination section 52, can be made larger than the illuminance threshold Er.

At this time, the supplementary illumination by the supplementary illumination section 52 may be continuous illumination at a light volume is sufficient to obtain the illuminance Ea. At the illuminance Ea less than the illuminance threshold Er, an image can be avoided from being detected by the image detector 4.

In order to supplement the illuminance using the supplementary illumination section 52, the illumination controller 62 detects a reflected light level of the measurement target 9 from the detection image obtained by the image processor 72 of the controlling PC 7 and adjusts a supplementary illumination level of the supplementary illumination section 52 on a basis of the obtained value of the reflected light level of the detection image.

Figure 5:
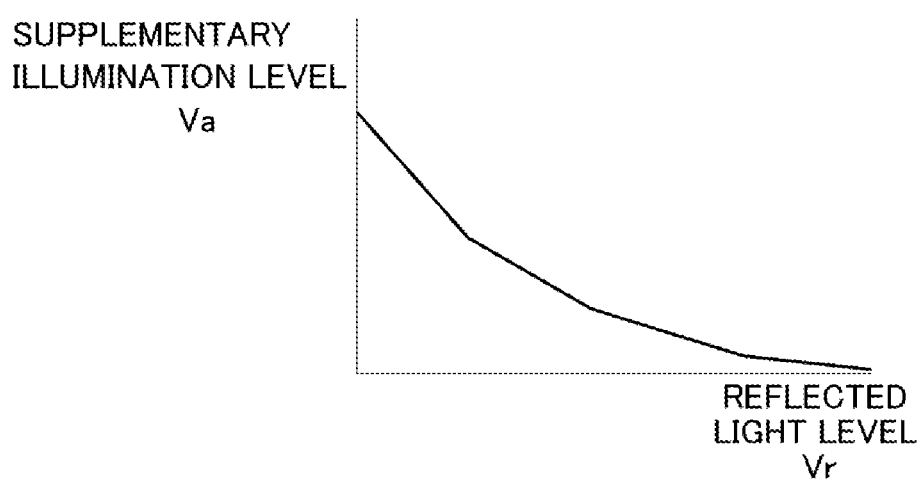
FIG. 5 is a graph showing luminescence properties of the supplementary illumination section in the exemplary embodiment.

As shown in FIG. 5, the output of the supplementary illumination section 52 is adjusted by the illumination controller 62 on a basis of a curve in which a reflected light level Vr is approximately in inverse proportion to a supplementary illumination level Va.

When the reflected light level Vr is sufficiently large, the supplementary illumination level Va is set at zero and the illuminance E1 is obtained by the pulsed illumination only of the main illumination section 51 (the left side in FIG. 4).

As the reflected light level Vr is decreased, the supplementary illumination level Va is increased. The continuous illumination of the supplementary illumination section 52 is added to the pulsed illumination of the main illumination section 51, thereby providing the illuminance E3 that is equal to the sum of the illuminance Ea and the illuminance E2 (the right side in FIG. 4).

The above exemplary embodiment can provide the following effects.

The image detection device 1 of the exemplary embodiment detects an image of the measurement target 9 with the image detector 4 through the lens system 3 whose focal point Pf is being cyclically changed. During the detection, the illumination controller 62 controls the pulsed illuminator 5 to provide pulsed illumination to the measurement target 9 in synchronization with the focal point Pf, whereby the detection image Im can be detected on the to-be-imaged surface at a desired focal point Pf.

The pulsed illuminator 5 controls the main illumination section 51 to emit pulsed light on the measurement target 9 in a normal state and, when the illuminance E2 of the measurement target 9 by the main illumination section 51 is equal to or less than the predetermined illuminance threshold Er, controls the supplementary illumination section 52 to supplement the illuminance on the measurement target 9. The pulsed illuminator 5 is thus capable of providing pulsed illumination at a high speed while keeping a sufficient light volume of the pulsed illumination. Specifically, the pulsed illuminator 5, which includes the main illumination section 51 and the supplementary illumination section 52 for ensuring a change in the light volume and the high-speed operation required for the pulsed illumination and a large light volume, respectively, can achieve, as a whole, both the high-speed operation and the large light volume.

As described above, the image detection device 1 of the exemplary embodiment can ensure a sufficient light volume while detecting the image with the liquid resonant lens system 3.

In the image detection device 1 of the exemplary embodiment, the supplementary illumination section 52 provides continuous illumination while the main illumination section 51 provides the pulsed illumination. Accordingly, the supplementary illumination section 52 does not require a timing control for the pulsed illumination, which can simplify the control configuration. Meanwhile, even if the supplementary illumination section 52 provides the continuous illumination, as long as the illuminance Ea on the measurement target 9 provided by the supplementary illumination section 52 is equal to or less than the illuminance threshold Er, an influence on the detection image can be avoided.

For instance, there is a possibility that an omnifocal image, which is obtained by sweeping the phase angle of the pulsed illumination to synthesize images taken at a plurality of focal points by the image detection device 1 of the exemplary embodiment obtains, includes a defocused portion due to the continuous light. However, since the light volume of the supplementary illumination section 52 of the exemplary embodiment is restricted, it is expected that a pure light volume at the fixed focal point is increased.

In the image detection device 1 of the exemplary embodiment, the epi-illuminator is used as the main illumination section 51 and the ring illuminator is used as the supplementary illumination section 52. Since the epi-illuminator is used as the main illumination section 51, the pulsed illumination is dominant in the detection image Im, whereby an accuracy of the focal point Pf can be improved by controlling the timing of the pulsed illumination. The supplementary illumination section 52, which is in a form of the ring illuminator, can increase an entire illuminance on the measurement target 9 from the periphery thereof, so that the supplementary illumination section 52 can supplement the illuminance on the measurement target 9 without affecting the pulsed illumination of the main illumination section 51.

Further, the epi-illuminator of the main illumination section 51 is different from the ring illuminator of the supplementary illumination section 52 in an incident angle of the illumination light Li, so that an image at a desired fixed-focal point can be obtained while observing an area of the measurement target 9 where an image is not highlighted only by the main illumination section 51.

When the above-described supplementary illumination section 52 is used, there is a possibility that the image contrast by the pulsed illumination of the main illumination section 51 is lost by the continuous light of the supplementary illumination section 52 to deteriorate an image quality of a fixed focal image. For this reason, it is important to adjust the light volume of the supplementary illumination section 52 so as to obtain a sufficient image contrast in the pulsed illumination by the main illumination section 51.

Figure 6:
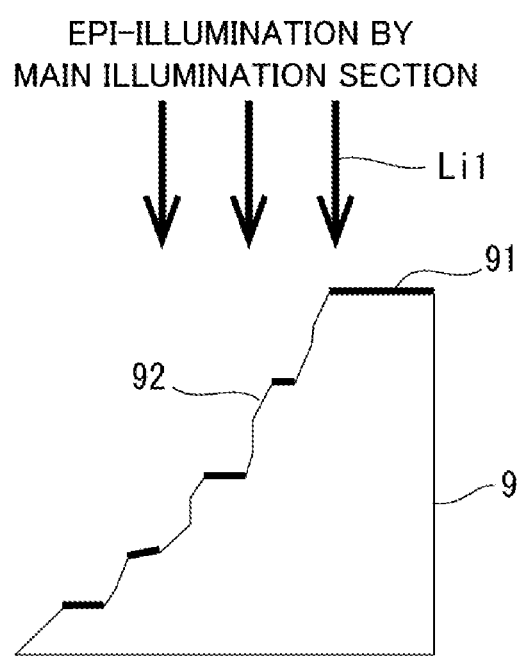
FIG. 6 shows an illumination condition only by epi-illumination of the main illumination section in the exemplary embodiment.

As shown in FIG. 6, when the measurement target 9 is irradiated with a light beam Li1 of the epi-illumination of the main illumination section 51, a near-horizontal area 91 of the surface of the measurement target 9 is brightly illuminated by the light beam Li1 at a small incident angle. In contrast, a near-vertical area 92 of the surface of the measurement target 9 is dark due to a large incident angle of the light beam Li1. Accordingly, an image contrast becomes clear depending on a shape of the surface of the measurement target 9.

Figure 7:
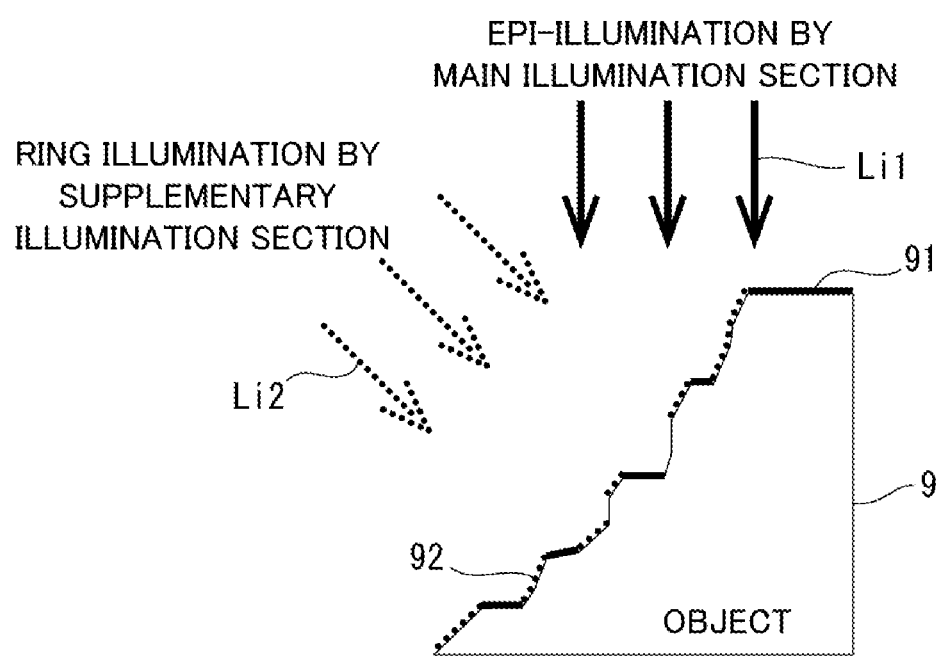
FIG. 7 shows an illumination condition by ring illumination of the supplementary illumination section in addition to the epi-illumination in the exemplary embodiment.

As shown in FIG. 7, when the measurement target 9 is irradiated with the light beam Li1 of the epi-illumination of the main illumination section 51 and a light bean Li2 of the ring illumination of the supplementary illumination section 52, the near-vertical area 92 of the surface of the measurement target 9 is brightly illuminated by the light beam Li2, thereby reducing the image contrast against the near-horizontal area 91. Accordingly, it is preferable to adjust the light volume of the supplementary illumination section 52 to ensure a suitable image contrast.

It should be noted that the scope of the invention is not limited by the above-described exemplary embodiments, but encompasses modifications, improvements and the like compatible with an object of the invention.

In the above exemplary embodiment, the supplementary illumination section 52 is configured to provide the continuous illumination. However, in some embodiments, for instance, the supplementary illumination section 52 also provides pulsed illumination similar to the main illumination section 51. As long as a main timing of the pulsed illumination is ensured by the main illumination section 51, an accuracy of the timing of the pulsed illumination of the supplementary illumination section 52 may be reduced, allowing for a simple control.

In the above exemplary embodiment, the main illumination section 51 is in a form of the epi-illuminator and the supplementary illumination section 52 is in a form of the ring illuminator. However, in some embodiments, for instance, both the main illumination section 51 and the supplementary illumination section 52 are configured to provide epi-illumination or ring illumination. It should be noted that the main illumination section 51 desirably provides the epi-illumination in order to provide the pulsed illumination at a sufficient light volume, and the supplementary illumination section 52 desirably provides the ring illumination, not the epi-illumination, due to an installation space.

In the above exemplary embodiments, the lens controller 6 and the controlling PC 7 are used in combination in order to drive and control the lens system 3. However, the lens controller 6 and the controlling PC 7 may be an integrated device configured to collectively drive, control and operate the lens system 3. However, such a combination of the lens controller 6 and the controlling PC 7 as in the exemplary embodiment allows the use of hardware required for driving and controlling the lens system 3 in a form of an independent dedicated lens control device. Moreover, a highly versatile personal computer is usable for operating and adjusting the setting of the lens controller 6 and further importing an image.

The drive signal Cf, which is in a sinusoidal waveform to cause sinusoidal oscillation at the focal point Pf in the exemplary embodiment, may be a triangular waveform, saw-tooth waveform, rectangular waveform, or the like.

The specific configuration of the lens system 3 may be changed as needed. Not only the configuration described in Patent Literature 1 but also a shape and a sizes of a package or a nature of a liquid to be resonated may be selected as needed.

In addition to the CCD image sensor, the image detector 4 may be an image sensor with use of other solid image-pickup device such as CMOS (Complementary Metal Oxide Semiconductor).

The pulsed illuminator 5 may be LED or other emitting devices such as LD (Laser Diode) or SLD (Super Luminescent Diode) which are switchable at a high speed.

What is claimed is:

1. An image detection device comprising:
    a liquid resonant lens system whose focal point is cyclically changeable;
    an image detector configured to detect an image of an object through the lens system;
    a pulsed illuminator configured to provide pulsed illumination to the object in synchronization with the focal point; and
    an illumination controller configured to control the pulsed illuminator such that the pulsed illuminator provides repetitive pulsed illuminations to the object for a predetermined period within a variable range of the focal point, and wherein
    the pulsed illuminator comprises a main illumination section and a supplementary illumination section, and
    the illumination controller is configured to provide pulsed illumination to the object with the main illumination section, and to supplement illuminance on the object with the supplementary illumination section when the illuminance on the object by the main illumination section is equal to or less than a predetermined threshold.

2. The image detection device according to claim 1, wherein the supplementary illumination section provides continuous illumination.

3. The image detection device according to claim 1, wherein the main illumination section is an epi-illuminator and the supplementary illumination section is a ring illuminator.

4. A pulsed illumination device configured to provide pulsed illumination to an object when taking an image of the object with a liquid resonant lens system, the pulsed illumination device comprising:
    a pulsed illuminator configured to provide pulsed illumination to the object in synchronization with a focal point of the liquid resonant lens system; and
    an illumination controller configured to control the pulsed illuminator such that the pulsed illuminator provides repetitive pulsed illuminations to the object for a predetermined period within a variable range of the focal point, and wherein
    the pulsed illuminator comprises a main illumination section and a supplementary illumination section, and
    the illumination controller is configured to supplement illuminance on the object with the supplementary illumination section when the illuminance on the object by the main illumination section is equal to or less than a predetermined threshold.

5. A pulsed light illumination method of providing pulsed illumination to an object when taking an image of the object with a liquid resonant lens system, the method comprising:
    providing pulsed illumination to the object in synchronization with a focal point of the liquid resonant lens system such that the pulsed illuminations are repeated to the object for a predetermined period within a variable range of the focal point with a main illumination section in a normal state; and
    supplementing illuminance on the object with a supplementary illumination section when the illuminance on the object by the main illumination section is equal to or less than a predetermined threshold.

* * * * *